(12) United States Patent
Shoji (10) Patent No.: US 12,038,411 B2
(45) Date of Patent: Jul. 16, 2024

(54) EVALUATION METHOD FOR REFLECTED WAVE

(71) Applicant: Nippon Telegraph and Telephone Corporation, Tokyo (JP)

(72) Inventor: Masanari Shoji, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 390 days.

(21) Appl. No.: 17/432,188

(22) PCT Filed: Feb. 14, 2020

(86) PCT No.: PCT/JP2020/005758
§ 371 (c)(1),
(2) Date: Aug. 19, 2021

(87) PCT Pub. No.: WO2020/175182
PCT Pub. Date: Sep. 3, 2020

(65) Prior Publication Data
US 2022/0170888 A1 Jun. 2, 2022

(30) Foreign Application Priority Data
Feb. 28, 2019 (JP) .................. 2019-036059

(51) Int. Cl.
*G01N 29/11* (2006.01)
*G01N 29/07* (2006.01)
*G01N 29/48* (2006.01)

(52) U.S. Cl.
CPC ............. *G01N 29/11* (2013.01); *G01N 29/48* (2013.01); *G01N 29/07* (2013.01);
(Continued)

(58) Field of Classification Search
CPC .. G01N 29/11; G01N 19/48; G01N 2291/044; G01N 29/07; G01N 2291/0422; G01N 2291/02854; G01N 29/48
(Continued)

(56) References Cited

U.S. PATENT DOCUMENTS

| | | | | |
|---|---|---|---|---|
| 4,307,616 A | * | 12/1981 | Vasile .................... | G01N 29/38 73/620 |
| 9,176,108 B2 | * | 11/2015 | Kwun .................... | G01N 29/11 |

(Continued)

FOREIGN PATENT DOCUMENTS

| | | | | |
|---|---|---|---|---|
| CN | 104458906 A | * | 3/2015 | ............. G01B 17/02 |
| CN | 107132276 A | * | 9/2017 | ............. G01H 9/004 |

(Continued)

OTHER PUBLICATIONS

Z. Hlavač, Detection of crack in a concrete element by impact-echo method, ISSN 1392-2114 Ultragarsas (Ultrasound), vol. 64, No. 2, 2009. (Year: 2009).*

(Continued)

*Primary Examiner* — Stephanie E Bloss
*Assistant Examiner* — Kevin C Butler
(74) *Attorney, Agent, or Firm* — Workman Nydegger (57) ABSTRACT

A method capable of accurately evaluating a reflected wave by properly evaluating an attenuation rate of an elastic wave without being influenced by a transmission loss in each of transmission and reception. In an evaluation method of a reflected wave for evaluating, in a long object, the presence or absence and the size of a defect of the long object by transmitting an elastic wave propagating in a longitudinal direction of the long object and receiving a reflected wave of the elastic wave, the size of the defect is evaluated by determining an attenuation rate $\alpha_1$ of the elastic wave based on an environment in which the long object is installed from (Continued)

a transmission wave amplitude $A_t$ of the elastic wave and a first reflected wave amplitude $A_r$ from a specific portion of the long object serving as a reference, creating a distance-amplitude characteristic curve of the reflected wave by using the attenuation rate $\alpha_1$, and comparing the distance-amplitude characteristic curve with the reflected wave amplitude.

7 Claims, 4 Drawing Sheets

(52) U.S. Cl.
CPC .............. *G01N 2291/02854* (2013.01); *G01N 2291/0422* (2013.01); *G01N 2291/044* (2013.01)

(58) Field of Classification Search
USPC .......................................................... 73/627
See application file for complete search history.

(56) References Cited

U.S. PATENT DOCUMENTS

| | | | |
|---|---|---|---|
| 11,240,069 B2 * | 2/2022 | Oishi | H04L 25/0224 |
| 2003/0037615 A1 * | 2/2003 | Madaras | G01N 29/07 73/598 |
| 2011/0296922 A1 * | 12/2011 | Ali | G01N 29/2412 73/588 |
| 2014/0028328 A1 * | 1/2014 | Kwun | G01N 33/383 324/616 |
| 2016/0290972 A1 * | 10/2016 | Lepage | G01N 29/226 |
| 2022/0170888 A1 * | 6/2022 | Shoji | G01N 29/4463 |
| 2022/0252547 A1 * | 8/2022 | Lepage | G01N 29/069 |
| 2023/0052887 A1 * | 2/2023 | Hong | G01N 29/265 |

FOREIGN PATENT DOCUMENTS

| | | | | |
|---|---|---|---|---|
| CN | 108680643 | A | * 10/2018 | |
| CN | 110088564 | A | * 8/2019 | ............... B06B 1/04 |
| CN | 110178045 | A | * 8/2019 | ............ G01J 1/0411 |
| CN | 112924548 | A | * 6/2021 | ............ G01L 5/0028 |
| EP | 3171166 | A1 | * 5/2017 | ............... G01H 1/00 |
| GB | 2482300 | A | * 2/2012 | ............ G01N 29/043 |
| JP | H06138102 | A | * 5/1994 | ............. G01N 29/00 |
| JP | 2944515 | B2 | * 1/1998 | ............. G01B 17/00 |
| JP | H109847 | A | * 1/1998 | ............. G01B 17/00 |
| JP | 2001041939 | A | * 2/2001 | ............. G01N 29/07 |
| JP | 2001305112 | A | * 10/2001 | ............. G01N 29/11 |
| JP | 2004301540 | A | * 10/2004 | ......... G01N 29/0645 |
| JP | 2005083907 | A | * 3/2005 | |
| JP | 2009014345 | A | * 1/2009 | ............. G01N 29/07 |
| JP | 2009036516 | A | * 2/2009 | ............. G01N 29/07 |
| JP | 4392129 | B2 | * 12/2009 | ........... G01N 17/006 |
| JP | 2009293981 | A | * 12/2009 | |
| JP | 2010054467 | A | * 3/2010 | |
| JP | 2012-149980 | A | 8/2012 | |
| JP | 2012149980 | A | * 8/2012 | |
| JP | 5663319 | B2 | * 2/2015 | |
| JP | 2015102405 | A | * 6/2015 | |
| KR | 19990072516 | A | * 9/1999 | ............. G01N 29/04 |
| WO | WO-2007068979 | A1 | * 6/2007 | ............ G01N 29/041 |

OTHER PUBLICATIONS

Tadeusz Stepinski et al., Instrument for Rock Bolt Inspection by Means of Ultrasound, 2015 IEEE International Ultrasonics Symposium Proceedings, 2015, 5 pp. (Year: 2015).*

Tadeusz Stepinski et al., Novel instrument for inspecting rock bolt integrity using ultrasonic guided waves, Measurement, 2021 Elsevier Ltd. All rights reserved., Mar. 8, 2021, pp. 0263-2241 (Year: 2021).*

Yoshiaki Nagashima et al., Piping thinning inspection technique using guide wave, Piping Technology, Hitachi Engineering & Service Co., Ltd., Jun. 19, 2008 (Year: 2008).*

Yoshiaki Nagashima et al., *Piping Thinning Inspection Technology Using Guide Waves <Introduction of Technology for Collectively Inspecting the Entire Piping and Recent Development Status>*, Plumbing Technology, Nippon Kogyo Publishing Co., Ltd., vol. 50. No. 7, 2008, pp. 19-24.

* cited by examiner

EVALUATION METHOD FOR REFLECTED WAVE

TECHNICAL FIELD

The present invention relates to a technique for inputting an elastic wave into a structure (long object) and determining a defect of the structure from a reflected wave.

BACKGROUND ART

Conventionally, there is used a pulse echo method which uses an elastic wave in order to detect a flaw or a defect of a long object which is long in size such as a pipeline, various piping, and an architectural structure. In general, the pulse echo method is an evaluation method in which an elastic wave in an ultrasonic range is emitted into a test object, a reflected wave reflected from a defective portion such as a flaw is detected, and the presence or absence, position, degree, and size of the defect are thereby evaluated.

The elastic wave which propagates in the long object in a longitudinal direction is normally a type of the elastic wave which is referred to as a guided wave. The evaluation method based on the pulse echo method using the guided wave is disclosed in, e.g., NPL 1.

CITATION LIST

Non Patent Literature

[NPL 1] Nagashima Yoshiaki, and three others, "*Gaidoha wo motiita Haikangennikukensagizyutu* (Pipe Thinning Inspection Technique using Guided Wave)", JAPAN INDUSTRIAL PUBLISHING CO., LTD., Piping Engineering, pp. 19-24, June 2008

SUMMARY OF THE INVENTION

Technical Problem

As a method for evaluating the degree and size of the defect in consideration of that the a measured reflected wave amplitude from the defective portion depends on a flaw detection distance (one-way distance of the propagation of the elastic wave), a distance-amplitude characteristic curve (or an echo height dividing line which uses a plurality of the distance-amplitude curves) is used. The distance-amplitude characteristic curve is created by using a calibration block or the like serving as a reference, and measurement is performed with an actual test body by using a measurement system of which sensitivity is adjusted with the calibration block or the like.

In the case where there is a difference in the attenuation of the elastic wave when the elastic wave propagates inside the test body, or in the propagation loss of vibration between the test body and a probe (a loss caused by transmission of vibration energy between the probe and a test body surface (a degree of a reduction in transmission efficiency)) between the test body and the calibration block, the distance-amplitude characteristic curve is normally corrected by using a $B_1$ echo which is the first bottom echo and the amplitude of a $B_2$ echo which is the second bottom echo.

However, in the case where the long object is embedded in, e.g., a solid or liquid medium, the attenuation of the elastic wave is large, and hence there are cases where the $B_2$ echo cannot be measured. That is, since the attenuation is large, there are cases where the $B_2$ echo cannot be measured, and only the $B_1$ echo can be measured. Alternatively, there can be a situation in which, instead of the influence of the attenuation, the $B_1$ echo is not reflected in an opposite direction again due to a structural factor of the test body and, as a result, the $B_2$ echo is not measured. Thus, in the case where only the $B_1$ echo can be measured, it is not possible to accurately evaluate a difference in the attenuation of the elastic wave or in the transmission loss of the vibration between the test body and the probe (the loss caused by the transmission of the vibration energy between the probe and the test body surface (the degree of the reduction in transmission efficiency)) between the test body and the calibration block, and hence a problem arises in that a large error occurs in the distance-amplitude characteristic curve or an evaluation result based on the distance-amplitude characteristic curve.

The present invention has been achieved in view of the problem, and an object thereof is to provide a precise evaluation method of a reflected wave which creates an accurate distance-amplitude characteristic curve by eliminating an influence of a difference in transmission loss and properly evaluating a difference in the attenuation of an elastic wave even in the case where only a $B_1$ echo can be measured.

Means for Solving the Problem

An evaluation method of a reflected wave according to an aspect of the present invention is an evaluation method of a reflected wave for evaluating, in a long object, a size of a defect of the long object by transmitting an elastic wave propagating in a longitudinal direction of the long object and receiving a reflected wave of the elastic wave, wherein the size of the defect is evaluated by determining an attenuation rate of the elastic wave based on an environment in which the long object is installed from a transmission wave amplitude of the elastic wave and a first reflected wave amplitude from a specific portion of the long object serving as a reference, creating a distance-amplitude characteristic curve of the elastic wave by using the attenuation rate, and comparing the distance-amplitude characteristic curve with the reflected wave amplitude.

Effects of the Invention

According to the present invention, it is possible to properly evaluate the reflected wave by properly evaluating the attenuation of the elastic wave and creating the accurate distance-amplitude characteristic curve even in the case where only the $B_1$ echo can be measured.

DESCRIPTION OF EMBODIMENTS

Hereinbelow, an embodiment of the present invention will be described by using the drawings. The same components in a plurality of the drawings are designated by the same reference numeral, and the description thereof will not be repeated.

Figure 1:
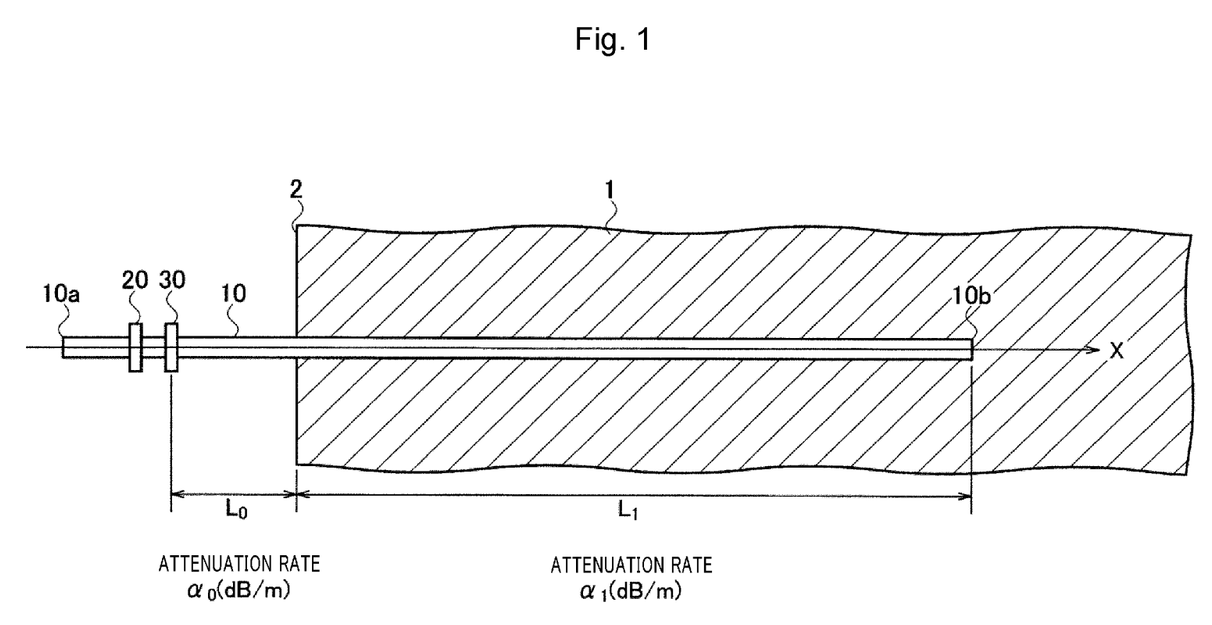
FIG. 1 is a view schematically showing an example of a long object to which an evaluation method of a reflected wave according to an embodiment of the present invention is applied.

FIG. 1 is a view schematically showing an example of a long object to which an evaluation method of a reflected wave according to the embodiment of the present invention is applied. The example of the long object shown in FIG. 1 is a rod part 10 of a guy anchor (or a guy anchor rod or an anchor rod). Hereinafter, there are cases where the rod part 10 of the guy anchor is referred to as a long object 10.

The guy anchor is equipment which is mainly used for a utility pole (not shown), and is embedded in the ground 1 and generates bearing force so as to play a role in sharing tension of a cable suspension wire (not shown) such that an unbalanced load is not applied to the utility pole. The guy anchor is usually formed of the rod part which is connected to the cable suspension wire at an upper end and a structure for fixing the rod part in the ground, and only the rod part is shown in the drawing.

Figure 2:
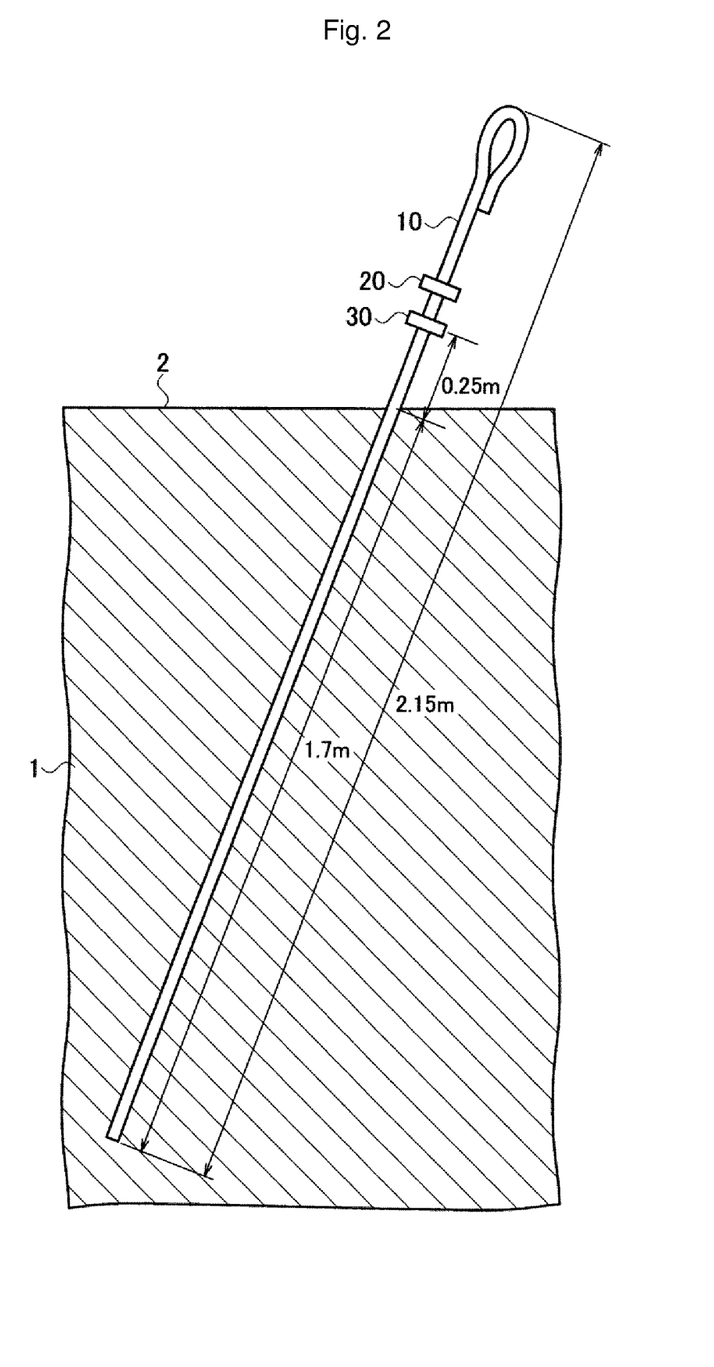
FIG. 2 is a view schematically showing a state in which the evaluation method of a reflected wave shown in FIG. 1 is used for evaluation of a rod part of a guy anchor.

FIG. 2 is a view schematically showing a state in which the rod part 10 of the guy anchor is embedded in the ground 1 for its purpose. As shown in FIG. 2, the most part of the rod part 10 of the guy anchor is embedded in the ground 1, and a part of the rod part 10 thereof protrudes from a ground surface 2. An upper end 10a of a portion protruding from the ground surface 2 is bent to the side of the ground surface 2 to form an engagement part. The engagement part and a portion near an upper portion of the utility pole (not shown) are tied together with the cable suspension wire (not shown), and bearing force is thereby generated such that the utility pole does not fall.

The rod part 10 of the guy anchor embedded in the ground 1 ages. Due to the aging, there are cases where a defect which is a reduction in thickness occurs. The guy anchor 10 whose thickness is reduced cannot generate required bearing force, and hence, in some cases, the utility pole may fall, which may cause a serious accident.

To cope with this, it is necessary to perform a periodic inspection (evaluation) to determine whether or not the structure has a defect. The evaluation method of a reflected wave according to the present embodiment is used to evaluate the degree of the defect of the long object shown in FIG. 1.

The evaluation method of a reflected wave according to the present embodiment uses a transmission probe 20 which inputs an elastic wave into the long object 10, and a reception probe 30 which receives the elastic wave (a transmission wave, a reflected wave) which propagates in an axial direction X of the long object 10. As the elastic wave, the elastic wave in an ultrasonic frequency range is usually used.

In general, the elastic wave which moves in the long object 10 in its longitudinal direction is limited to a specific elastic wave (usually distinguished with a mode and a frequency) specified by a boundary condition that a vibration mode is dependent on the side shape of the long object, and is referred to as a guided wave. Unlike a bulk wave which is used in a conventional supersonic flaw detection, the guided wave has such characteristics that many modes are present in general and the guided wave has dispersiveness (the sound speed has frequency dependence).

Note that, in each of FIG. 1 and FIG. 2, a source for supplying a transmission signal to the transmission probe 20, a measurement unit for receiving a reflected elastic wave and measuring a reflected wave amplitude, and the like are common equipment. (Reference Literature: M. Shoji, et al., "Ultrasonic Guided Wave Testing of Anchor Rods Embedded in Soil", 2016 IEEE Int. Ultrasonics Symp. (IUS), pp. 1-4). Therefore, the description thereof is omitted.

Figure 3:
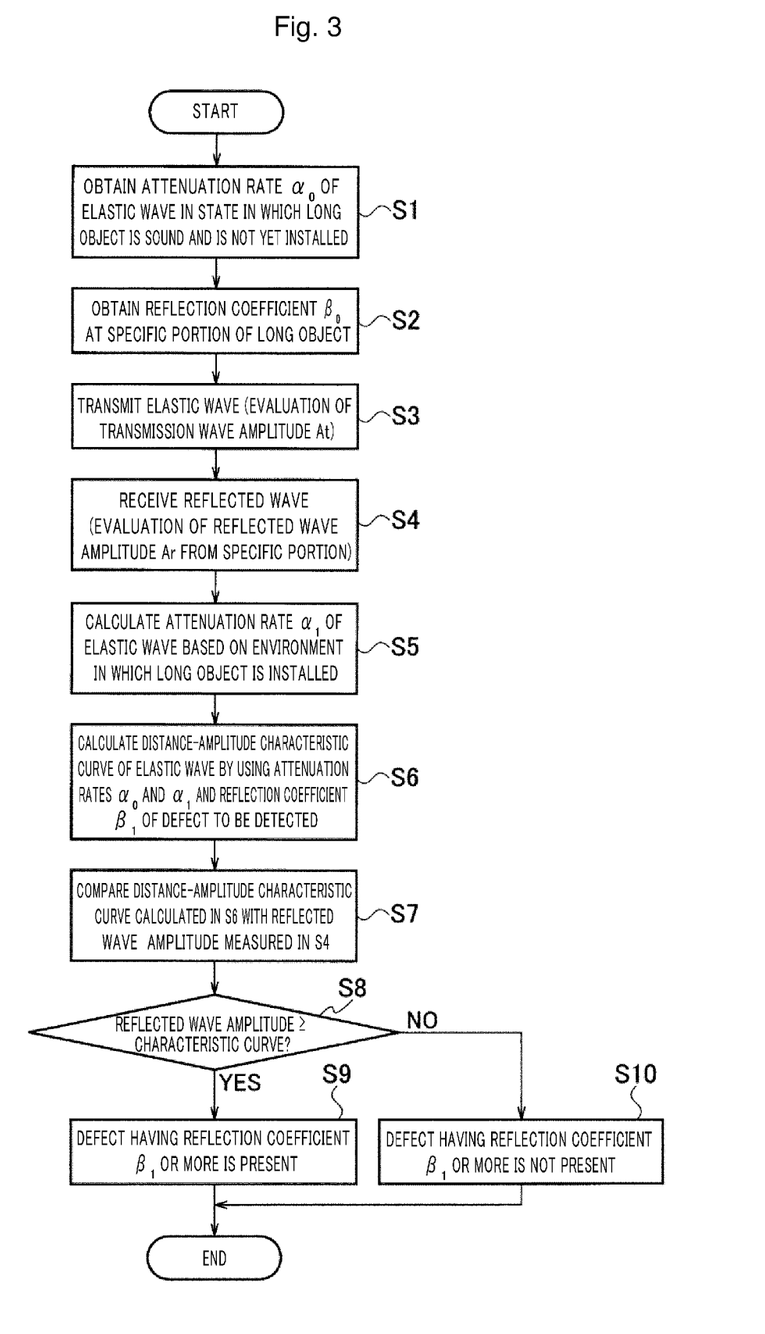
FIG. 3 is a flowchart showing processing steps of the evaluation method of a reflected wave according to the embodiment of the present invention.

FIG. 3 is a flowchart showing processing steps of the evaluation method of a reflected wave according to the present embodiment. With reference to FIG. 3, the evaluation method of a reflected wave will be described in detail.

In the evaluation method of a reflected wave according to the present embodiment, when processing is started, an attenuation rate $\alpha_0$ of the elastic wave in the long object when the long object 10 is in a sound state and is not yet installed (embedded) is obtained (Step S1). With regard to the attenuation rate $\alpha_0$ of the elastic wave when the long object 10 is in the sound state, the long object 10 having the same specifications is prepared separately and the attenuation rate $\alpha_0$ thereof is measured in advance in a state in which the long object 10 is not embedded (is in the air). Alternatively, the attenuation rate $\alpha_0$ of the long object 10 may be measured in advance in a state in which the long object 10 is not yet embedded in the ground, and may be recorded. Alternatively, in the case where the portion of the long object 10 protruding from the ground surface 2 after the long object 10 is embedded can be determined to be sound from its appearance, the attenuation rate $\alpha_0$ may be measured and evaluated on the spot.

As is clear from its unit (dB/m), the attenuation rate $\alpha_0$ of the elastic wave is a value normalized with a distance in the axial direction X of the long object 10. For example, in the portion of the long object 10 which protrudes from the ground surface 2, together with the transmission probe 20 and the reception probe 30 shown in FIG. 2, by disposing another reception probe at a predetermined interval, it is possible to determine the attenuation rate $\alpha_0$ by measuring attenuation caused by the movement of the elastic wave between two reception probes.

Next, a reflection coefficient $\beta_0$ of the elastic wave at a specific portion of the long object 10 serving as a reference is obtained (Step S2). The specific portion mentioned herein denotes a bottom surface 10b in an example shown in FIG. 2. The reflection coefficient $\beta_0$ is, e.g., the amplitude of an elastic wave which has just been reflected at the bottom surface 10b with respect to that of an incident elastic wave on the bottom surface 10b in amplitude 1. With regard to the reflection coefficient $\beta_0$, the long object 10 having the same specifications is prepared separately, and the reflection coefficient $\beta_0$ is measured in advance in the state in which the long object 10 is not embedded (is in the air). Alternatively, the reflection coefficient $\beta_0$ is measured in advance in the state in which the long object 10 is not yet embedded in the ground.

Next, the elastic wave is transmitted from the transmission probe 20. The amplitude of the elastic wave is measured when the elastic wave transmitted from the transmission probe 20 passes through the reception probe 30, and a transmission wave amplitude $A_t$ of the elastic wave is determined from a measurement value (Step S3).

Next, the reception probe 30 receives the reflected wave. With waveform data of the reflected wave, the first reflected wave amplitude Ar when the elastic wave is reflected at the specific portion is evaluated (Step S4). In the case of this example, the reflected wave amplitude to be evaluated is the amplitude of a bottom echo ($B_1$ echo) reflected at the bottom surface 10b.

The amplitude $A_r$ of the first bottom echo received by the reception probe 30 is theoretically expressed as the following formula:

Math. 1

$$A_r = \beta_0 A_t 10^{-\frac{\alpha_0 L_0 + \alpha_1 L_1}{10}} \quad (1)$$

wherein $\beta_0$ is the reflection coefficient at the bottom surface 10b, $A_t$ is the transmission wave amplitude of the elastic wave received by the reception probe 30, $\alpha_0$ is the attenuation rate of the elastic wave in the sound long object 10 in the air, $L_0$ is the length of the portion of the long object 10 which protrudes from the ground surface 2, $\alpha_1$ is the (average) attenuation rate of the elastic wave in the portion of the long object 10 in the ground 1, and $L_1$ is the length of the portion of the long object 10 in the ground 1.

Therefore, the attenuation rate $\alpha_1$ of the elastic wave in the portion of the long object 10 in the ground 1 can be determined according to the following formula.

Math. 2

$$\alpha_1 = \frac{10}{L_1} \log \frac{\beta_0 A_t}{A_r} - \frac{L_0}{L_1} \alpha_0 \quad (2)$$

The evaluation method of a reflected wave of the present embodiment calculates the attenuation rate $\alpha_1$ of the elastic wave based on an environment in which the long object is installed based on Formula (2) (Step S5). In this example, the long object is the rod part 10 of the guy anchor, and the environment of the installation is the ground 1. In general, in the evaluation of $A_t$ and $A_r$, an influence of a transmission loss is present. In the evaluation method of a reflected wave of the present embodiment, $A_t$ and $A_r$ are evaluated based on the measurement of the same transmission wave and by measuring the transmission wave and the reception wave with the same reception probe 30, and a ratio between $A_t$ and $A_r$ is used, and hence it is possible to determine the attenuation rate $\alpha_1$ according to Formula (2) without the influence of the transmission loss.

The attenuation rate $\alpha_1$ is determined based on the transmission wave amplitude $A_t$ of the elastic wave, the attenuation rate $\alpha_0$ of the elastic wave in the (sound) portion of the long object 10 which is not embedded, the reflection coefficient $\beta_0$ of the elastic wave at the specific portion of the long object 10 serving as the reference, the reflected wave amplitude $A_r$ of the elastic wave which is reflected from the specific portion, the length $L_0$ of the portion of the long object 10 which is not embedded, and the length $L_1$ of the portion of the long object 10 which is embedded.

Next, a distance-amplitude characteristic curve of the elastic wave is calculated by using the calculated attenuation rate $\alpha_1$ and attenuation rate $\alpha_0$, the lengths $L_0$ and $L_1$ of the individual portions, and a reflection coefficient $\beta_1$ of the defect to be detected (Step S6). The distance-amplitude characteristic curve of the elastic wave can be calculated according to the following formulae.

Math. 3

$$D(x) = \pm \beta_1 A_t 10^{-\frac{\alpha_0 x}{10}} \, (0 \leq x \leq L_0) \quad (3)$$

$$D(x) = \pm \beta_1 A_t 10^{-\frac{\alpha_0 L_0 + \alpha_1 (x-L_0)}{10}} \, (L_0 \leq x \leq L_0 + L_1) \quad (4)$$

This distance-amplitude characteristic curve accurately reflects that the attenuation rate of the corresponding elastic wave is $\alpha_0$ (dB/m) in the portion of the long object 10 in the air, and is $\alpha_1$ (dB/m) in the portion embedded in a solid medium (the ground 1 in this example).

Consequently, by comparing the distance-amplitude characteristic curve determined from the defect to be detected having the reflection coefficient $\beta_1$ with the amplitude of the reflected wave of the elastic wave which is actually measured, it is possible to evaluate whether or not the defect having the reflection coefficient $\beta_1$ is present in the long object.

Therefore, in the evaluation method of a reflected wave according to the present embodiment, next, the distance-amplitude characteristic curve calculated in Step S6 is compared with the reflected wave amplitude of the elastic wave measured in Step S4 (Step S7). When the reflected wave amplitude is greater than the distance-amplitude characteristic curve (YES in Step S8), it is determined that the defect having the reflection coefficient $\beta_1$ or more is present (Step S9).

When the reflected wave amplitude of the elastic wave is less than the amplitude of the distance-amplitude characteristic curve (NO in Step S8), it is determined that the defect having the reflection coefficient $\beta_1$ or more is not present (Step S10).

As described thus far, the evaluation method of a reflected wave according to the present embodiment is the evaluation method of a reflected wave for evaluating, in the long object 10, the degree and the size (directly the reflection coefficient of the elastic wave for the defect) of the defect of the long object 10 by transmitting the elastic wave propagating in the longitudinal direction of the long object 10 and receiving the reflected wave of the elastic wave, wherein the size of the defect is evaluated by determining the attenuation rate $\alpha_1$ of the elastic wave based on the environment in which the long object is installed from the transmission wave amplitude $A_t$ of the elastic wave and the first reflected wave amplitude $A_r$ from the specific portion of the long object 10 serving as the reference, creating the distance-amplitude characteristic curve of the elastic wave by using the attenuation rate $\alpha_1$, and comparing the distance-amplitude characteristic curve with the reflected wave amplitude. With this, even in the case where only the $B_1$ echo can be measured, it is possible to properly evaluate the presence or absence and the size of the defect by accurately evaluating the attenuation of the elastic wave and creating the distance-amplitude characteristic curve without the influence of the transmission loss.

Specific Example of Evaluation

A description will be given of a specific example in which the evaluation method of a reflected wave according to the embodiment of the present invention is actually used. FIG. 2 is a view schematically showing a state in which the evaluation method of a reflected wave of the present embodiment is used for the evaluation of the long object.

As shown in FIG. 2, a portion of the rod part 10 of the guy anchor having a length of 1.7 m from its tip is embedded in the ground, and a portion thereof having a length of 0.45 m protrudes from the ground surface 2. The reception probe 30 is disposed to be spaced from the ground surface 2 by 0.25 m, and the transmission probe 20 is disposed at a predetermined interval from the reception probe 30.

Thus, the rod part 10 of the guy anchor includes the transmission probe 20 which transmits the elastic wave and the reception probe 30 which receives the reflected wave, and the transmission probe 20 and the reception probe 30 are disposed at the predetermined interval such that the transmission probe 20 is disposed on the near side of the portion of the long object 10 which is not embedded and the reception probe 30 is disposed on the far side of the portion of the long object 10 which is not embedded. With this, for one transmission wave, the same reception probe 30 can receive the reception of the transmission wave and the reception of the reflected wave and, by normalizing the amplitude value of the reflected wave with the amplitude of the transmission wave (by obtaining the ratio therebetween), it is possible to evaluate the attenuation rate $\alpha_1$ without the influence of the transmission loss in each of the transmission probe and the reception probe 30. The attenuation rate $\alpha_0$ and the reflection coefficient $\beta_0$ at the bottom surface are measured in advance by measuring the rod part having the same specifications or the like.

In the evaluation environment shown in FIG. 2, the evaluation of a reflected wave of an elastic wave having the L(0,1) mode and 60 kHz was performed according to a two-probe method (Reference Literature: M. Shoji, et al., "Ultrasonic Guided Wave Testing of Anchor Rods Embedded in Soil", 2016 IEEE Int. Ultrasonics Symp. (IUS), pp. 1-4). As shown in FIG. 2, $L_0=0.25$ m and $L_1=1.7$ m are satisfied.

Figure 4:
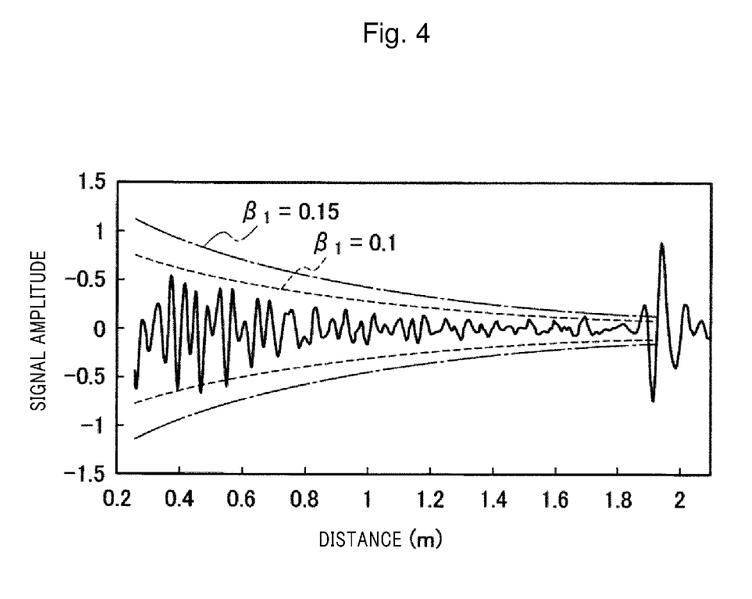
FIG. 4 is a view in which a measured reflected wave and a distance-amplitude characteristic curve are superimposed on each other and shown.

FIG. 4 is a view in which the measured reflected wave and the distance-amplitude characteristic curve are superimposed on each other and shown. The horizontal axis in FIG. 4 indicates a distance (m) from the reception probe 30, and the vertical axis therein indicates the amplitude of the reflected wave.

A large amplitude seen in the vicinity of the horizontal axis 1.95 m shown in FIG. 4 is the reflected wave ($B_1$ echo) from an end surface 10b. Note that waveform data shown in FIG. 4 represents data in the ground 1, and only Formula (4) corresponding also to the distance-amplitude characteristic curve is shown.

As a result of measurement with the sound rod part 10 of the guy anchor having the same specifications before the rod part 10 is embedded in the ground 1, the attenuation rate $\alpha_0=0.2$ dB/m, and the reflection coefficient $\beta_0=1$ were satisfied. The attenuation rate $\alpha_1$ in the evaluation environment shown in FIG. 2 satisfies $\alpha_1=5.5$ dB/m.

As shown in FIG. 5, in this example, it can be determined that the defect (flaw) having the reflection coefficient $\beta_1=0.15$ is not present, but the defect having the reflection coefficient $\beta_1=$about 0.1 is present.

The distance-amplitude characteristic curve is created based on the reflection coefficient of the defect to be detected. Accordingly, by comparing the waveform data of the reflected wave obtained by one measurement with a plurality of the distance-amplitude characteristic curves, it is possible to evaluate the presence or absence of the defect of the long object 10 based on a plurality of references.

When Formula (1) is solved for $A_t$,

Math. 4

$$A_t = \frac{A_r}{\beta_0} 10^{\frac{\alpha_0 L_0 + \alpha_1 L_1}{10}} \quad (5)$$

is satisfied, and hence, by substituting this formula into Formula (3) and Formula (4), the distance-amplitude characteristic curve can also be expressed as the following formulae.

Math. 5

$$D(x) = \pm \frac{\beta_1}{\beta_0} A_r 10^{\frac{\alpha_0(L_0-x)+\alpha_1 L_1}{10}} \quad (0 \leq x \leq L_0) \quad (6)$$

$$D(x) = \pm \frac{\beta_1}{\beta_0} A_r 10^{-\frac{\alpha_1\{x-(L_0+L_1)\}}{10}} \quad (L_0 \leq x \leq L_0 + L_1) \quad (7)$$

The distance-amplitude characteristic curve shown in FIG. 4 may also be determined by using Formula (7). In addition, as the long object, the rod part 10 of the guy anchor has been described as an example, but the long object is not limited to this example. It is possible to apply the evaluation method of a reflected wave according to the present embodiment to any long object. Further, the specific portion at which the elastic wave is reflected has been described by using the bottom surface 10b as the example, but the specific portion is not limited to the bottom surface 10b. For example, the specific portion may also be a bent portion or the like.

In addition, the description has been made by using the example in which two probes consisting of the transmission probe 20 and the reception probe 30 are used, but the evaluation method described above may be performed by using one transmission-reception probe. Further, the environment in which the long object 10 is installed may be any environment such as a liquid, gas, or gel.

Thus, it will be easily understood that the present invention includes various embodiments which are not described herein. Accordingly, the technical scope of the present invention should be determined only by the matters to define the invention in the scope of claims regarded as appropriate based on the above description.

REFERENCE SIGNS LIST

1 Ground
2 Ground surface
10 Rod part of guy anchor (Long object)
10a Upper end
10b Bottom surface (Specific portion serving as reference)
20 Transmission probe
30 Reception probe
$\alpha_0$ Attenuation rate of elastic wave in state in which long object is sound and is not yet embedded (installed)
$\alpha_1$ Attenuation rate of elastic wave in portion of long object which is embedded
$\beta_0$ Reflection coefficient of elastic wave at specific portion of long object serving as reference
$\beta_1$ Reflection coefficient of defect to be detected
$A_t$ Transmission wave amplitude of elastic wave received by reception probe
$A_r$ Reflected wave amplitude of elastic wave from specific portion received by reception probe

The invention claimed is:

1. An evaluation method of a reflected wave for evaluating, in an object, a size of a defect of the object by transmitting an elastic wave propagating in a longitudinal direction of the object and receiving a reflected wave of the elastic wave, wherein the size of the defect is evaluated by:
determining an attenuation rate of the elastic wave based on an environment in which the object is installed from a transmission wave amplitude of the elastic wave and a first reflected wave amplitude from a specific portion of the object serving as a reference, wherein the environment in which the object is installed includes embedding a first portion of the object into a ground surface and a second portion projecting from the ground surface, the first portion being larger than the second portion, the transmission wave being generated by a transmission probe included in the second portion and the first reflected wave being received a reception probe included in the second portion, the transmission wave passing through the reception probe when being transmitted;

creating a distance-amplitude characteristic curve of the elastic wave by using the attenuation rate; and comparing the distance-amplitude characteristic curve with the reflected wave amplitude.

2. The evaluation method of a reflected wave according to claim 1, wherein the attenuation rate is determined based on the transmission wave amplitude of the elastic wave, an attenuation rate of the elastic wave in a portion of the object which is not embedded, a reflection coefficient of the elastic wave at the specific portion, the reflected wave amplitude reflected from the specific portion, a length of the portion of the object which is not embedded, and a length of a portion of the object which is embedded.

3. The evaluation method of a reflected wave according to claim 2, wherein the distance-amplitude characteristic curve is created based on a reflection coefficient of the defect to be detected for the elastic wave.

4. The evaluation method of a reflected wave according to claim 2, wherein a transmission probe which transmits the elastic wave and a reception probe which receives the reflected wave are provided, and the transmission probe and the reception probe are disposed at a predetermined interval such that the transmission probe is disposed on a near side of the portion of the object which is not embedded and the reception probe is disposed on a far side of the portion of the object which is not embedded.

5. The evaluation method of a reflected wave according to claim 1, wherein the distance-amplitude characteristic curve is created based on a reflection coefficient of the defect to be detected for the elastic wave.

6. The evaluation method of a reflected wave according to claim 5, wherein a transmission probe which transmits the elastic wave and a reception probe which receives the reflected wave are provided, and the transmission probe and the reception probe are disposed at a predetermined interval such that the transmission probe is disposed on a near side of the portion of the object which is not embedded and the reception probe is disposed on a far side of the portion of the object which is not embedded.

7. The evaluation method of a reflected wave according to claim 1, wherein a transmission probe which transmits the elastic wave and a reception probe which receives the reflected wave are provided, and the transmission probe and the reception probe are disposed at a predetermined interval such that the transmission probe is disposed on a near side of the portion of the object which is not embedded and the reception probe is disposed on a far side of the portion of the object which is not embedded.

* * * * *